(12) United States Patent
Uemoto et al.

(10) Patent No.: US 12,365,187 B2
(45) Date of Patent: Jul. 22, 2025

(54) LIQUID APPLICATION APPARATUS, LIQUID APPLICATION METHOD, AND STORAGE MEDIUM

(71) Applicants: Nao Uemoto, Kanagawa (JP); Yuki Tsuchiya, Kanagawa (JP)

(72) Inventors: Nao Uemoto, Kanagawa (JP); Yuki Tsuchiya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 158 days.

(21) Appl. No.: 18/122,723

(22) Filed: Mar. 17, 2023

(65) Prior Publication Data

US 2023/0302827 A1   Sep. 28, 2023

(30) Foreign Application Priority Data

Mar. 23, 2022 (JP) ................ 2022-046659
Nov. 28, 2022 (JP) ................ 2022-189437

(51) Int. Cl.
*B41J 3/407* (2006.01)
*B41J 25/00* (2006.01)

(52) U.S. Cl.
CPC ............ *B41J 3/407* (2013.01); *B41J 3/4073* (2013.01); *B41J 25/001* (2013.01); *B41J 25/003* (2013.01); *B41J 25/005* (2013.01)

(58) Field of Classification Search
CPC ........ B41J 3/407; B41J 3/4073; B41J 25/001; B41J 25/003; B41J 25/005
See application file for complete search history.

(56) References Cited

U.S. PATENT DOCUMENTS

| 9,035,981 B2 * | 5/2015 | Dal Col | B41J 3/407 347/108 |
|---|---|---|---|
| 2016/0193858 A1 | 7/2016 | Tsuchiya | |
| 2016/0243820 A1 | 8/2016 | Yanaka et al. | |
| 2019/0270316 A1 | 9/2019 | Tsuchiya | |
| 2020/0171837 A1 | 6/2020 | Tsuchiya | |
| 2020/0171840 A1 | 6/2020 | Tsuchiya | |

(Continued)

FOREIGN PATENT DOCUMENTS

| JP | 5-098608 | 4/1993 |
|---|---|---|
| WO | WO2006/017800 A2 | 2/2006 |

*Primary Examiner* — Geoffrey S Mruk
(74) *Attorney, Agent, or Firm* — XSENSUS LLP

(57) ABSTRACT

A liquid application apparatus includes a liquid discharge head and processing circuitry. The liquid discharge head discharges liquid. The processing circuitry causes the liquid application apparatus to sequentially move to each of a plurality of divided areas obtained by dividing a liquid application area in which the liquid discharge head performs liquid application. The processing circuitry causes the liquid discharge head to move to each of the divided areas to perform liquid application. After the liquid discharge head performs first liquid application to one divided area of the divided areas, the processing circuitry causes the liquid application apparatus to move to another one divided area adjacent to or partially overlapping the one divided area and causes the liquid discharge head to perform second liquid application to said another one divided area to connect an image generated by the first liquid application and an image generated by the second liquid application.

6 Claims, 15 Drawing Sheets

(56) References Cited

U.S. PATENT DOCUMENTS

| | | |
|---|---|---|
| 2022/0016916 A1 | 1/2022 | Saito et al. |
| 2022/0212479 A1 | 7/2022 | Saito et al. |
| 2022/0314657 A1 | 10/2022 | Matsuki et al. |
| 2022/0314658 A1 | 10/2022 | Mezaki et al. |
| 2022/0314667 A1 | 10/2022 | Tsuchiya et al. |

* cited by examiner

FIG. 3A  PRINT FIRST SEGEMNT
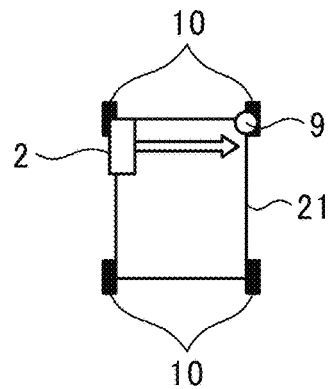
FIG. 3B  PRINT SECOND SEGEMNT
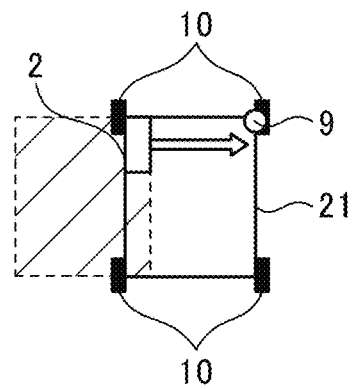
FIG. 3C  PRINT NINTH SEGEMNT
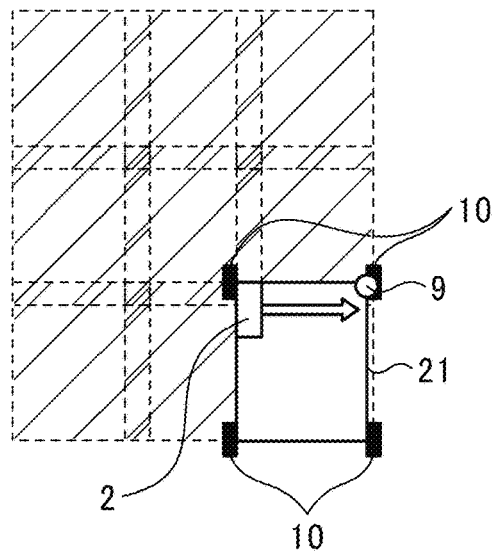

LIQUID APPLICATION APPARATUS, LIQUID APPLICATION METHOD, AND STORAGE MEDIUM

CROSS-REFERENCE TO RELATED APPLICATIONS

This patent application is based on and claims priority pursuant to 35 U.S.C. § 119(a) to Japanese Patent Application No. 2022-046659, filed on Mar. 23, 2022, and No. 2022-189437, filed on Nov. 28, 2022, in the Japan Patent Office, the entire disclosure of each of which is hereby incorporated by reference herein.

BACKGROUND

Technical Field

Embodiments of the present disclosure relate to a liquid application apparatus, a liquid application method, and a storage medium.

Related Art

Liquid application apparatuses are known to discharge ink from a head to an object to be drawn to draw a drawing object while the liquid application apparatus moves a carriage.

For example, a technique is known in which an object to be printed is divided into a plurality of areas and dot density is reversed between left and right areas.

SUMMARY

Embodiments of the present disclosure described herein provide a novel liquid application apparatus including a liquid discharge head and processing circuitry. The liquid discharge head discharges liquid. The processing circuitry causes the liquid application apparatus to sequentially move to each of a plurality of divided areas obtained by dividing a liquid application area in which the liquid discharge head performs liquid application. The processing circuitry causes the liquid discharge head to move to each of the divided areas to perform liquid application. After the liquid discharge head performs first liquid application to one divided area of the divided areas, the processing circuitry causes the liquid application apparatus to move to another one divided area adjacent to or partially overlapping the one divided area and causes the liquid discharge head to perform second liquid application to said another one divided area to connect an image generated by the first liquid application and an image generated by the second liquid application.

Embodiments of the present disclosure described herein provide a novel liquid application method to be executed in a liquid application apparatus including a liquid discharge head. The method includes: sequentially moving the liquid application apparatus to each of a plurality of divided areas obtained by dividing a liquid application area in which the liquid discharge head performs liquid application; moving the liquid discharge head in X and Y scanning directions in each of the plurality of divided areas to perform liquid application; and after the liquid discharge head performs first liquid application to one divided area of the plurality of divided areas, moving the liquid application apparatus to another one divided area adjacent to or partially overlapping the one divided area and causing the liquid discharge head to perform second liquid application to said another one divided area to connect an image generated by the first liquid application and an image generated by the second liquid application.

Embodiments of the present disclosure described herein provide a novel non-transitory, computer-readable storage medium storing computer-readable program code that causes a liquid application apparatus to perform: discharging liquid by a liquid discharge head of the liquid application apparatus; sequentially moving the liquid application apparatus to each of a plurality of divided areas obtained by dividing a liquid application area in which the liquid discharge head performs liquid application; moving the liquid discharge head in X and Y scanning directions in each of the plurality of divided areas to perform liquid application; and after the liquid discharge head performs first liquid application to one divided area of the plurality of divided areas, moving the liquid application apparatus to another one divided area adjacent to or partially overlapping the one divided area and causing the liquid discharge head to perform second liquid application to said another one divided area to connect an image generated by the first liquid application and an image generated by the second liquid application.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, w % herein:

FIGS. 3A, 3B, and 3C are diagrams illustrating an example in which the liquid application apparatus prints outside a carriage scanning range, according to an embodiment of the present disclosure:

Figure 1A:
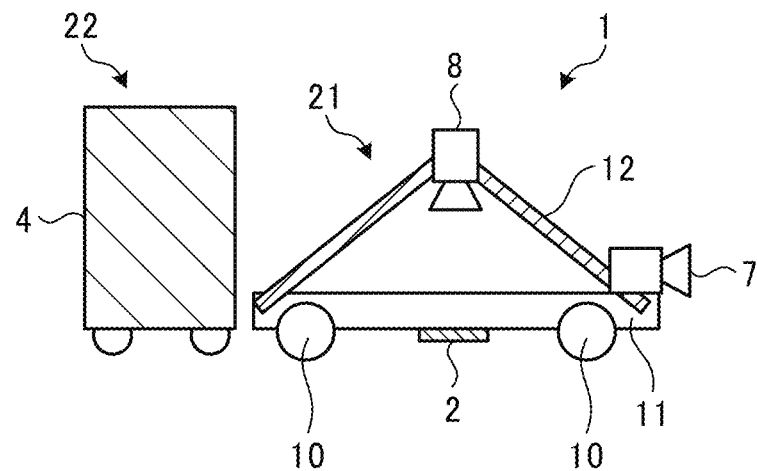
FIGS. 1A and 1B are diagrams illustrating a configuration of a liquid application apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a liquid application apparatus, a liquid application method, and a storage medium according to embodiments of the present disclosure are described with reference to the drawings.

Figure 1B:
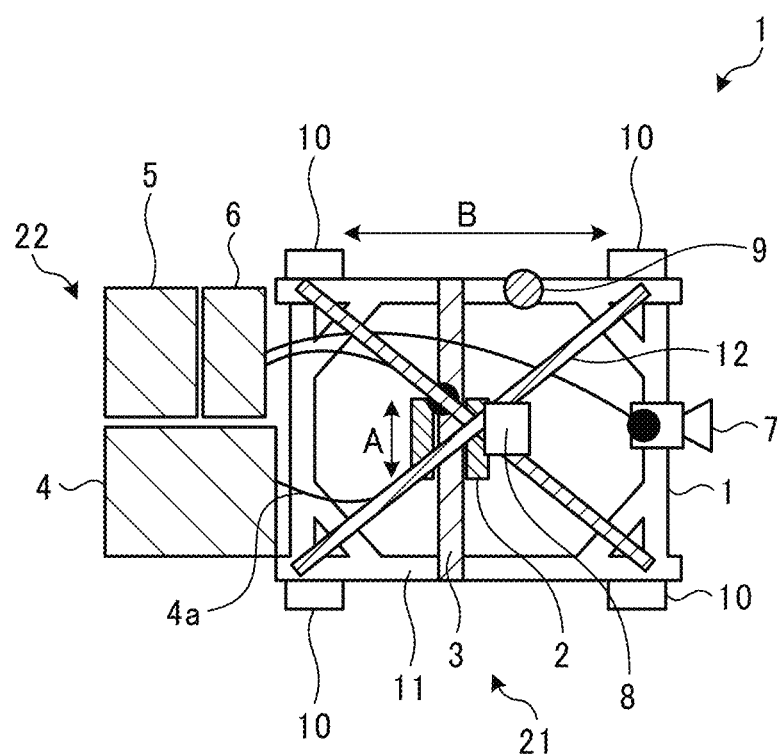

FIGS. 1A and 1B are diagrams illustrating a configuration of a liquid application apparatus 1 according to an embodiment of the present disclosure. FIG. 1A is a side view of the liquid application apparatus 1, and FIG. 1B is a plan view of the liquid application apparatus 1 as viewed from above according to an embodiment of the present disclosure. The liquid application apparatus 1 illustrated in FIG. 1 is a liquid application apparatus that sequentially moves to each of a plurality of divided areas obtained by dividing a wide printing area such as a road surface or a wall surface. The liquid application apparatus 1 divides a large shape (a pattern, a symbol, or a line) into a plurality of segments and performs printing. Note that "print" is referred to apply or spray liquid to, for example, a road surface or a wall surface.

As illustrated in FIG. 1, the liquid application apparatus 1 includes a printer 21 and a controller 22. The printer 21 included in the liquid application apparatus 1 includes an ink discharge head 2 (carriage) that is a liquid discharge head to discharge ink for printing. In other words, the ink discharge head 2 (carriage) is configured to discharge liquid. The plurality of ink discharge heads 2 (carriage) is provided in the printer 21 and used for various colors and multipurpose. The "ink" is liquid to be applied or sprayed to a road surface or a wall surface. The printer 21 has a gantry structure in which the ink discharge head 2 (carriage) is movable in the directions of arrow A in FIG. 1B on a rail 3 horizontally disposed in a housing 11. Although the liquid application apparatus 1 according to the present embodiment includes the printer 21 and the controller 22, the liquid application apparatus 1 may have a system configuration in which the printer 21 and the controller 22 are separated.

The printer 21 includes a plurality of tires 10 and a motor 20 (see FIG. 2) in a lower portion of the housing 11. The printer 21 can move in four directions of front, rear, left, and right by rotation control of the tires 10 by the motor 20.

The ink discharge head 2 (carriage) includes a head mover 23 (see FIG. 2) using a belt, a pulley, and a motor. The head mover 23 reciprocates the ink discharge head 2 (carriage) in the directions of arrow A along the rail 3 of the printer 21. The rail 3 includes a rail mover 24 (see FIG. 2) using a belt, a pulley, and a motor. The rail mover 24 reciprocates the ink discharge head 2 on the rail 3 along the housing 11 of the printer 21 in directions (indicated by arrow B in FIG. 1B) orthogonal to the longitudinal direction of the rail 3. In other words, the ink discharge head 2 (carriage) can freely move in the left-right directions (X scanning directions) that are indicated by arrow A and the front-rear directions (Y scanning directions) that are indicated by arrow B in the horizontal direction in the housing 11 of the liquid application apparatus 1.

The controller 22 of the liquid application apparatus 1 includes an ink supplier 4 that supplies ink used for printing. The ink supplier 4 is connected to the ink discharge head 2 (carriage) through a pipe 4a serving as an ink channel. Although the ink supplier 4 moves following the printer 21 in the present embodiment, the present disclosure is not limited to such configuration, and the ink supplier 4 may move independently from the printer 21.

The controller 22 includes a power supplier 5 that supplies electric power for driving the head mover 23, the rail mover 24, the motor 20, and the ink discharge head 2 (carriage) of the printer 21. Since the power supplier 5 is used outside the controller 22 and supplies power to components other than the head mover 23, the rail mover 24, the motor 20, and the ink discharge head 2 (carriage) of the printer 21, the power supplier 5 is preferably a large-capacity storage battery.

The controller 22 includes an arithmetic device 6 that performs drive control of the head mover 23, the rail mover 24, the motor 20, and the ink discharge head 2 (carriage) of the printer 21 and estimates the self-position of the liquid application apparatus 1 based on the coordinate data acquired from a global positioning system (GPS) 9.

Further, the printer 21 includes a three-dimensional camera 7, which is a three-dimensional shape measuring device for ambient measurement that captures surrounding images of the liquid application apparatus 1, in a front portion of the housing 11. The three-dimensional camera 7 sends the captured images to the arithmetic device 6. The arithmetic device 6 uses the images captured by the three-dimensional camera 7 mainly for avoiding contact with an obstacle by using a method such as image correlation. In addition, the arithmetic device 6 uses the images captured by the three-dimensional camera 7 to estimate a movement amount and a posture of the liquid application apparatus 1. Note that the three-dimensional camera 7 is supplied with power from its own battery. However, the three-dimensional camera 7 may be supplied with power from the power supplier 5 on the assumption of continuous operation.

The printer 21 includes a two-dimensional camera 8 for capturing images of the road surface and the vicinity of the painted image. The two-dimensional camera 8 is disposed at the apex of a structure 12 formed by assembling pipes in a quadrangular pyramid shape. The two-dimensional camera 8 sends the captured images to the arithmetic device 6. The arithmetic device 6 uses the images captured by the two-dimensional camera 8 to estimate an amount of movement and a speed of the ink discharge head 2 (carriage) and the rail 3 using a method such as the image correlation. Note that the two-dimensional camera 8 is supplied with power from its own battery. However, the two-dimensional camera 8 may be supplied with power from the power supplier 5 on the assumption of continuous operation.

The liquid application apparatus 1 includes the GPS 9 that measures a current position of the liquid application apparatus 1 on the earth. The GPS 9 sends acquired coordinate data of the liquid application apparatus 1 to the arithmetic device 6. The arithmetic device 6 stores the acquired coordinate data by the GPS 9 as odometry information such as a cumulative movement amount of the liquid application apparatus 1. Note that the liquid application apparatus 1 may include a plurality of GPSs 9, and the arithmetic device 6 may correct errors of the coordinate data based on a difference between the coordinate data acquired by the plurality of GPSs 9.

Next, a description is given of a hardware configuration of the arithmetic device 6 includes in the liquid application apparatus 1.

Figure 2:
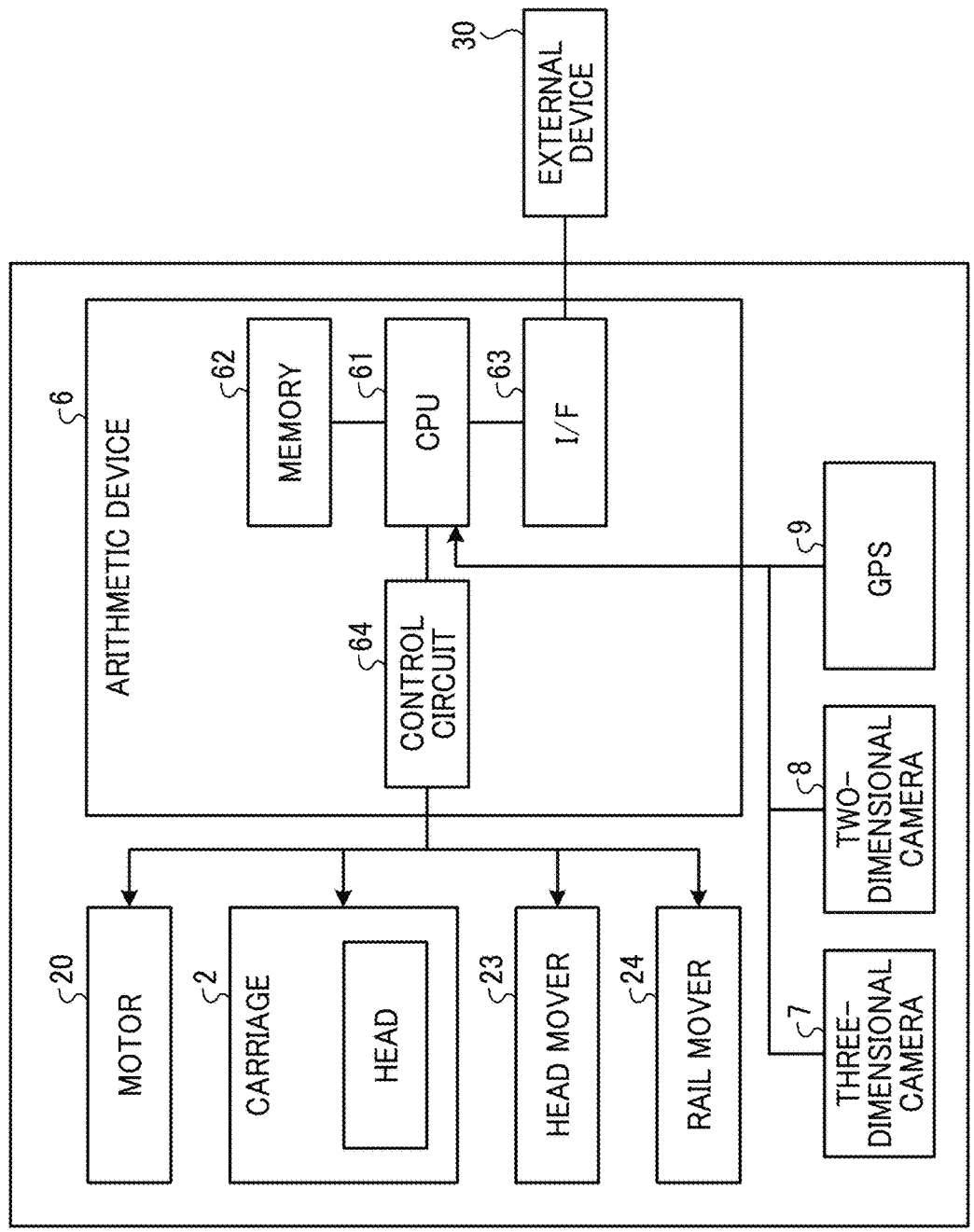
FIG. 2 is a block diagram illustrating a hardware configuration of an arithmetic device of the liquid application apparatus according to an embodiment of the present disclosure.

FIG. 2 is a block diagram illustrating the hardware configuration of the arithmetic device 6 included the liquid application apparatus 1. As illustrated in FIG. 2, the arithmetic device 6 includes a central processing unit (CPU) 61, a memory 62 that includes a read only memory (ROM) and a random access memory (RAM), an input-and-output interface (I/F) 63, and a control circuit 64. These units and components are electrically connected to each other through a system bus.

The CPU 61 comprehensively controls an operation of the liquid application apparatus 1. The CPU 61 performs drive control of the head mover 23, the rail mover 24, the motor 20, and the ink discharge head 2 (carriage) of the printer 21 through the control circuit 64 and estimates the self-position of the liquid application apparatus 1 based on the coordinate data acquired by the GPS 9.

The CPU 61 uses the images captured by the three-dimensional camera 7 for estimation of the movement amount and the posture of the liquid application apparatus 1. The CPU 61 uses the images captured by the two-dimensional camera 8 to estimate the amount of movement and the speed of the ink discharge head 2 (carriage) and the rail 3 using a method such as the image correlation. The CPU 61 stores the coordinate data acquired by the GPS 9 as odometry information such as a cumulative movement amount of the liquid application apparatus 1.

The memory 62 stores programs that are used to boot the CPU 61. The memory 62 is used as a work area of the CPU 61.

The I/F 63 is an interface to connect various external devices 30 such as tablet terminals, smartphones, personal computers, servers, and laptop personal computers.

As described above, the liquid application apparatus 1 can move in four directions, i.e., front, rear, left, and right directions. The ink discharge head 2 (carriage) can scan for printing in four directions of front, rear, left, and right inside the housing 11 of the liquid application apparatus 1.

FIGS. 3A, 3B, and 3C are diagrams illustrating an example in which the liquid application apparatus 1 prints outside a carriage scanning range, according to an embodiment of the present disclosure. When the liquid application apparatus 1 prints an image outside the carriage scanning range of the ink discharge head 2 (carriage), the liquid application apparatus 1 divides the entire image into a plurality of segments as illustrated in FIG. 3C and provides an overlapping area between images of adjacent segments to complete printing the image while moving the liquid application apparatus 1.

Next, descriptions are given of characteristic functions operated by the liquid application apparatus 1 in the above-described printing process.

Figure 4:
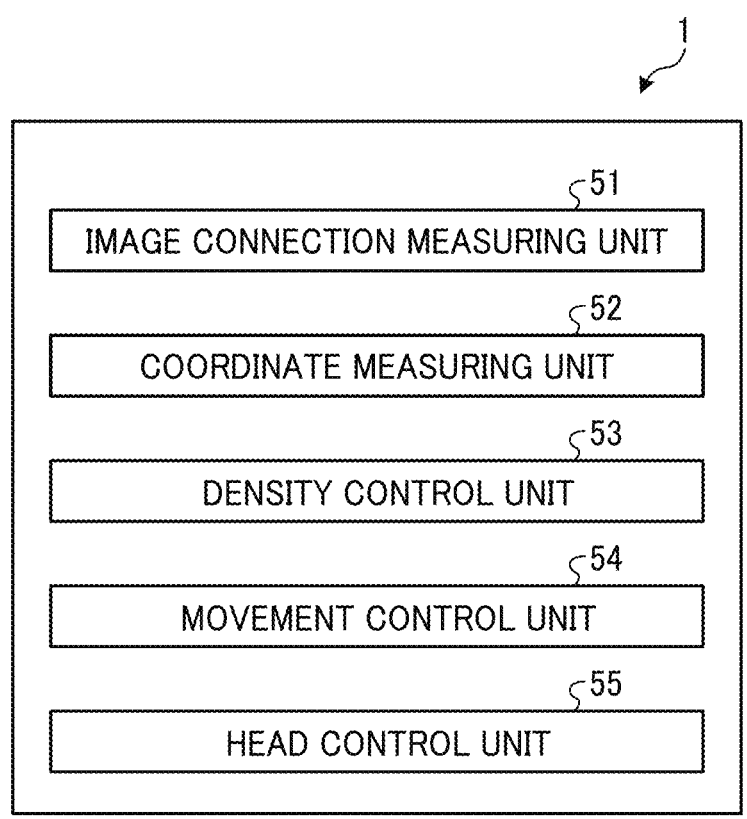
FIG. 4 is a functional block diagram illustrating functions of the liquid application apparatus according to an embodiment of the present disclosure.

FIG. 4 is a functional block diagram illustrating functions of the liquid application apparatus 1 according to an embodiment of the present disclosure. All or any part of the processing functions performed by the functional blocks illustrated in FIG. 4 may be implemented by programs executed by the CPU 61 of the arithmetic device 6 or may be implemented by a hardware such as wired logic.

As illustrated in FIG. 4, in order to divide the entire image into a plurality of segments for printing, the liquid application apparatus 1 includes a movement control unit 54, ahead control unit 55, an image connection measuring unit 51, a coordinate measuring unit 52, and a density control unit 53.

The movement control unit 54 controls the sequential movement of the liquid application apparatus 1 to each of a plurality of divided areas obtained by dividing a liquid application area in which the ink discharge head 2 (carriage) performs liquid application. More specifically, the movement control unit 54 controls the sequential movement of the liquid application apparatus 1 to an adjacent or a partially-overlapping divided area.

The head control unit 55 controls the movement of the ink discharge head 2 (carriage) in X and Y scanning directions in each divided area to perform liquid application. The head control unit 55 does not perform a liquid application operation in a case where the divided area does not have application data. In this way, when the head control unit 55 does not perform the liquid application operation due to no application data to be applied to the divided area, the movement control unit 54 controls the movement to the next adjacent or partially-overlapping divided area including the "overlapping area".

The image connection measuring unit 51 reads a reference position (start position of image writing) set in an area where end portions of divided areas obtained by dividing the entire image into a plurality of segments overlap with each other by the two-dimensional camera 8 and sets the reference position as a reference origin of image writing.

The coordinate measuring unit 52 measures the self-position coordinates (position and posture) of the liquid application apparatus 1 by a self-position estimation method in which global navigation satellite system (GNSS) measurement using the GPS 9 and an image (surrounding image data) captured by the three-dimensional camera 7 are combined.

The density control unit 53 calculates an application amount of ink in consideration of the overlap in left and right areas, or left, right, upper, and areas in an overlapping area where end portions of divided areas obtained by dividing a printing area into a plurality of areas overlap with each other, and executes blurring processing in which application density in the X and Y scanning direction is adjusted. Note that examples of the overlap in the left, right, upper, and lower directions include the case where left and right areas overlap with an upper area and the case where left and right areas overlap with two, upper and lower areas, in addition to the case where left and right areas overlap with a lower area as illustrated in FIG. 14 described later.

Hereinafter, descriptions are given of a printing process of completing an image while the liquid application apparatus 1 moves.

Figure 5:
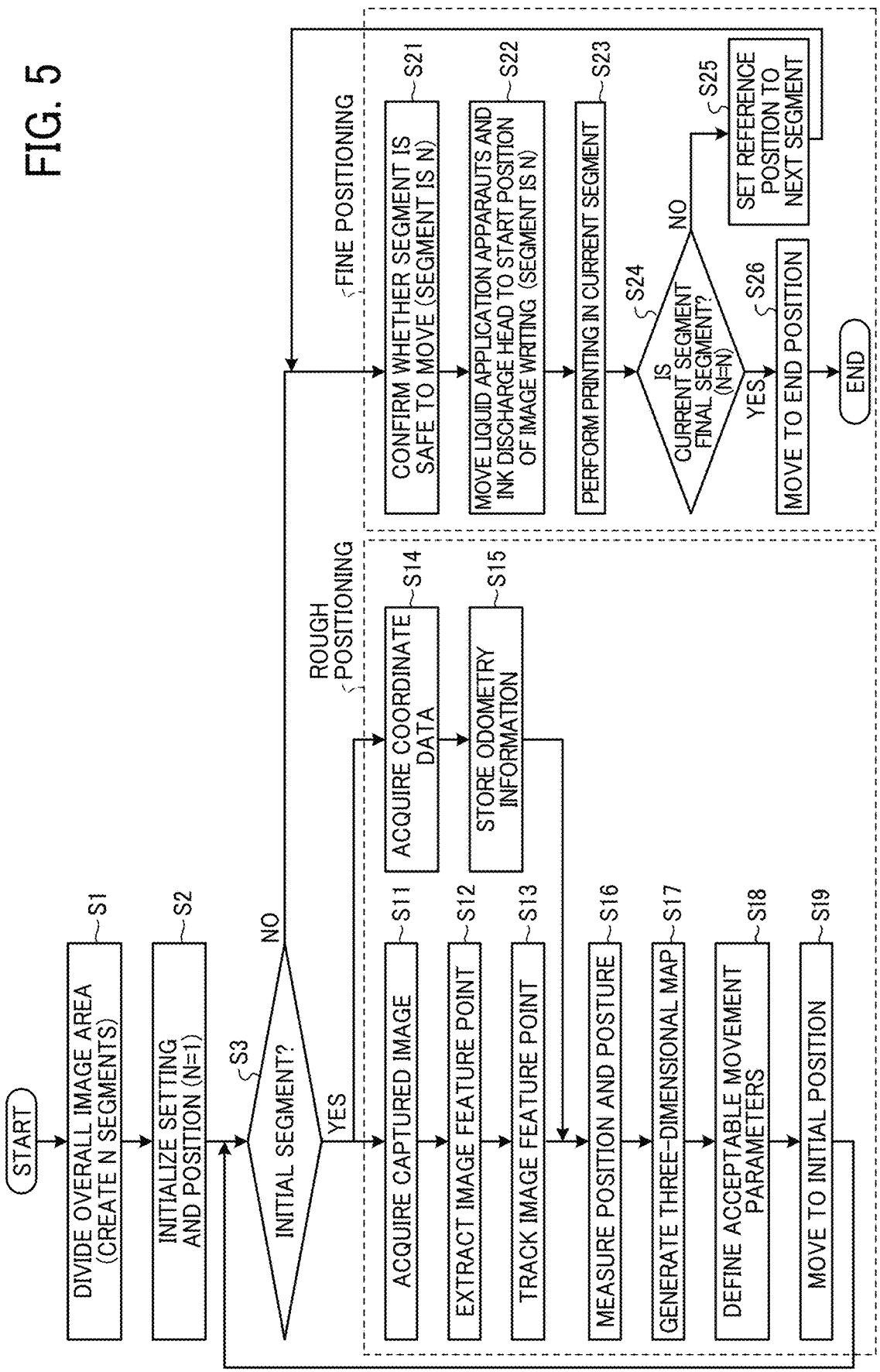
FIG. 5 is a flowchart illustrating a printing process in the arithmetic device, according to an embodiment of the present disclosure.

FIG. 5 is a flowchart illustrating the printing process in the arithmetic device 6, according to an embodiment of the present disclosure. When the liquid application apparatus 1 performs printing in a wide printing area such as a road surface, an image to be printed is larger than the printing area in a state where the liquid application apparatus 1 stops moving. In such a case, as illustrated in FIG. 5, the arithmetic device 6 divides the entire image into a plurality of (N) segments (step S1). Note that the arithmetic device 6 provides an overlapping area between images of adjacent segments such that the segments overlap each other. More specifically, the arithmetic device 6 sets a road surface reference position A to be included in a plurality of segments. Details of the blurring processing on the overlapping area is described later.

The process of dividing the entire image into a plurality of (N) segments may be performed by an external device 30.

Next, when the number of divisions is determined, in step S2, the arithmetic device 6 prepares a movement based on initial settings (ink discharge conditions, carriage speed of main scanning and sub-scanning) and an initial position (segment 1 (n=1) is set as an area in which an image is first formed).

Next, in step S3, the arithmetic device 6 determines whether the current target segment is the initial segment (segment 1).

When the arithmetic device 6 determines that the current target segment is the initial segment (segment 1) (YES in step S3), the liquid application apparatus 1 proceeds the operation to a processing routine for performing rough positioning.

As illustrated in FIG. 5, when the current target segment is the initial segment (segment 1), the arithmetic device 6 acquires an image (surrounding image) captured by the three-dimensional camera 7 (step S11), extracts image feature points (step S12), and tracks the image feature points (step S13).

In addition, when the current target segment is the initial segment (segment 1), the arithmetic device 6 causes the coordinate measuring unit 52 to acquire the coordinate data (step S14), and the arithmetic device 6 stores the acquired coordinate data as the odometry information such as the cumulative movement amount of the liquid application apparatus 1 (step S15).

Next, the arithmetic device 6 performs the rough positioning (in centimeters) and measures the posture of the liquid application apparatus 1 based on the tracked image features and the stored odometry information (step S16).

Next, the arithmetic device 6 generates a three-dimensional map (step S17), defines acceptable movement parameters (step S18), and moves the liquid application apparatus 1 to the initial position (step S19).

On the other hand, when the arithmetic device 6 determines that the current target segment is any other segment (of the segment 2 to the segment N) than the initial segment (NO in step S3), the liquid application apparatus 1 proceeds the operation to a processing routine for performing fine positioning.

When the current target segment is any other segment (of the segment 2 to the segment N) than the initial segment, the arithmetic device 6 confirms safety by the three-dimensional camera 7 whether the liquid application apparatus 1 can move to the current segment so that the liquid application apparatus 1 does not come into contact with an obstacle during movement (step S21).

Next, the arithmetic device 6 moves the liquid application apparatus 1 and the ink discharge head 2 (carriage) to the start position of image writing set with high accuracy using the image connection measuring unit 51 that performs measurement with the two-dimensional camera 8 (step S22).

Next, the arithmetic device 6 performs printing in the current segment (moves the carriage of the ink discharge head in the main scanning direction and the sub-scanning direction) (step S23) and determines whether the current segment is the final segment (n=N) (step S24).

When the current segment is not the final segment (NO in step S24), the arithmetic device 6 sets a reference position for the next segment serving as a reference for positioning before moving to the next segment (n=n+1) (step S25) and returns to step S21. A method of setting the reference position is described later.

On the other hand, when the current segment is the final segment (YES in step S24), the arithmetic device 6 moves the liquid application apparatus 1 to an end position (step S26).

In the movement of the liquid application apparatus 1, the positional accuracy is several centimeters when the coordinate measuring unit 52 using GNSS alone is used, and joints of segments in the image may be noticeable. In the present embodiment, after the liquid application apparatus 1 moves, the image connection measuring unit 51 determines the start position of image writing while reading, with the two-dimensional camera 8, the reference position set before the movement of the liquid application apparatus 1. The liquid application apparatus 1 repeats the operations described above. Accordingly, the liquid application apparatus 1 can perform road painting with less noticeable joints of segments in a case where the liquid application apparatus 1 prints a large image. Since the operations include a repetitive process, the operations can be developed to be performed by a robotized automatic operation system. In addition, the operations may be performed by a remote operation.

Method of Setting Reference Position (Start Position of Image Writing)

Next, descriptions are given of several examples of a method of setting a reference position (start position of image writing) serving as a reference of a position when the liquid application apparatus 1 forms an image of the next segment.

Figure 6A:
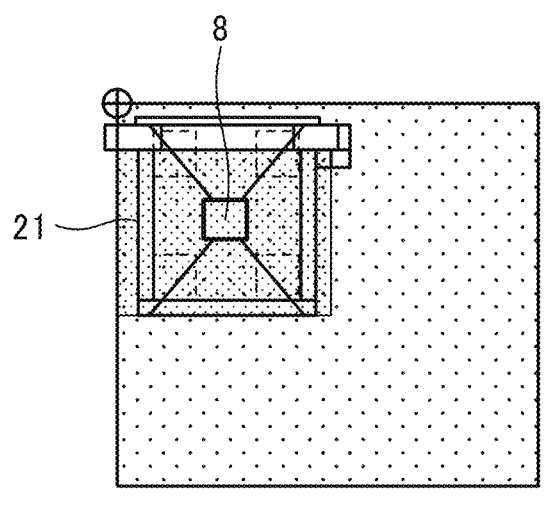
FIGS. 6A and 6B are diagrams illustrating a first setting example of a reference position, according to an embodiment of the present disclosure.
Figure 6B:
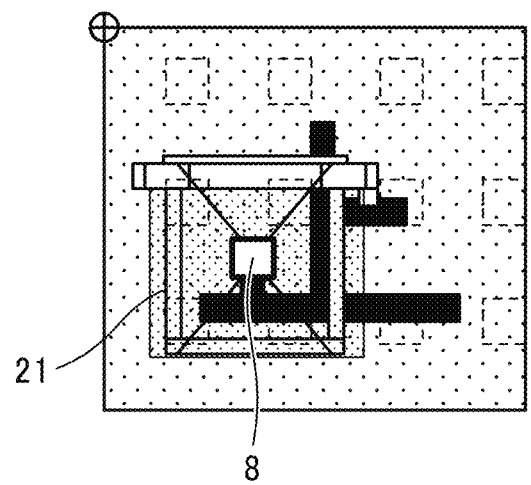

FIGS. 6A and 6B are diagrams illustrating a first setting example of the reference position, according to an embodiment of the present disclosure. As illustrated in FIG. 6, in the first setting example of the reference position, the liquid application apparatus 1 sets end portions of the divided areas (segments) such that the end portions overlap with each other. The image connection measuring unit 51 reads a road surface condition (reference position) of the overlapping area with the two-dimensional camera 8, estimates the self-position of the liquid application apparatus 1 based on the read information, and sets the self-position as the reference origin for the start position of image writing. Specific descriptions are given as follows.

The two-dimensional camera 8 reads road surface information (road surface condition) at four corners of an image forming area to be painted (dotted square frames in FIG. 6).

The liquid application apparatus 1 is moved such that one or more of the four dotted square frames are included in an image capturing area of the two-dimensional camera 8 (using GNSS information).

The liquid application apparatus 1 extracts the road surface conditions (dotted square frame areas) from two-dimensional images, which is captured with the two-dimensional camera 8, before and after the movement, and performs position detection (fine position estimation).

According to the first setting example of the reference position, information such as detection mark, chalk line, and end portion of character in the preceding area are not needed, and thus an effect of reducing the number of steps can be obtained. For the overlapped road surface information, in the case of asphalt, grain-size-adjusted crushed stones adjusted to a good aggregate grain size or a stabilization treatment material obtained by mixing crushed stones with cement or lime is used for the upper roadbed material. Accordingly, a characteristic pattern is formed on the road surface by a combination of crushed stones and asphalt. Such patterns are recorded as the road surface information (road surface condition) and used for positioning.

Figure 7A:
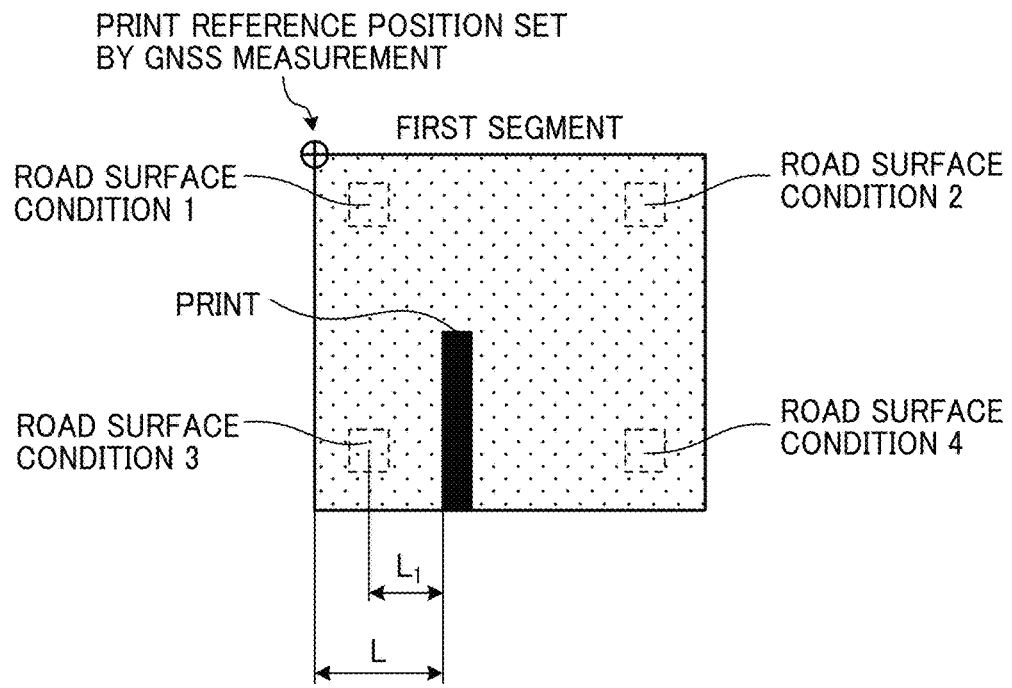
FIGS. 7A and 7B are diagrams illustrating an example in which the liquid application apparatus reads a road surface condition at a reference position to use as a reference for a start position of image writing, according to an embodiment of the present disclosure.
Figure 7B:
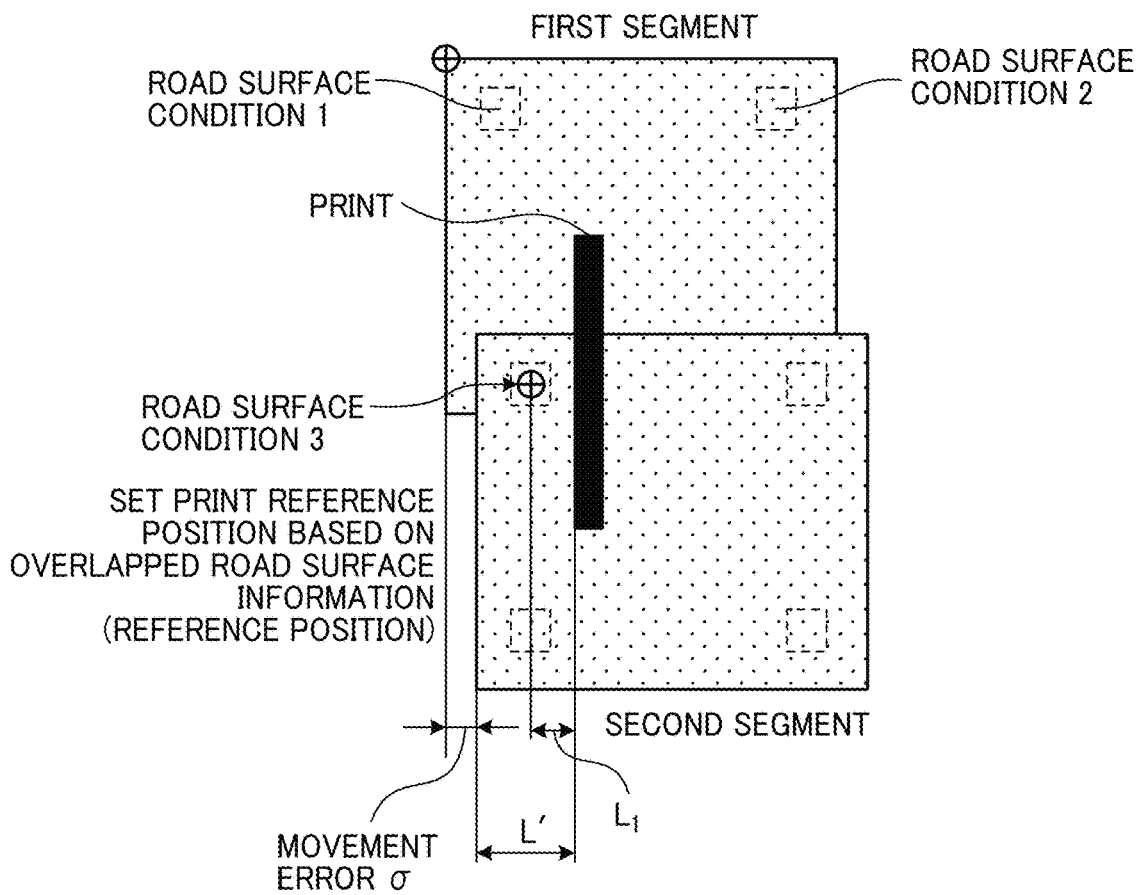

FIGS. 7A and 7B are diagrams illustrating an example in which the liquid application apparatus 1 reads the road surface condition at the reference position to use as a reference for the start position of image writing, according to an embodiment of the present disclosure. FIG. 7A illustrates a state before the movement, and FIG. 7B illustrates a state after the movement. As illustrated in FIG. 7A, printing of a first segment is performed with reference to an edge of the image forming area (set by GNSS measurement). In this case, the start position of image writing is at a distance L from the edge of the image forming area. On the other hand, the liquid application apparatus 1 also recognizes the positional relation between the start position of image writing and the road surface condition. For example, the start position of image writing is at a distance L1 from the center of road surface condition 3 in FIG. 7A. On the other hand, as illustrated in FIG. 7B, when the liquid application apparatus 1 moves to the second segment, a movement error may occur. In this case, a print reference position of the road surface condition 3 of the overlapping area is set, the start position of image writing of the second segment is at a distance L1 from the print reference position, and thus image formation without a joint error is performed.

Note that a method of stopping the self-propelled liquid application apparatus 1 with reference to the read position may also be applied. In this case, the writing reference position in the liquid application apparatus 1 can be fixed. The former corrects the start position of image writing, and the latter corrects the stop position of the self-propelled liquid application apparatus 1.

Figure 8A:
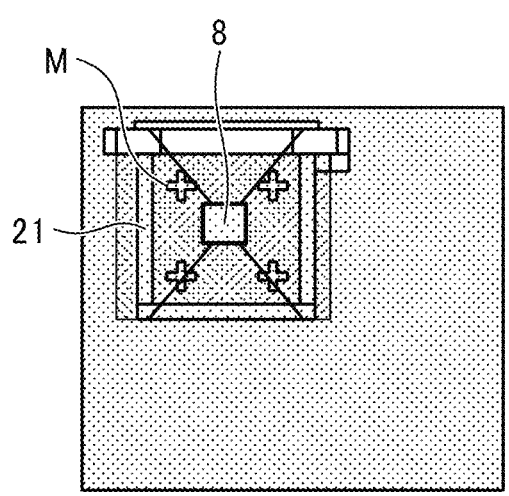
FIGS. 8A and 8B are diagrams illustrating a second setting example of the reference position, according to an embodiment of the present disclosure.
Figure 8B:
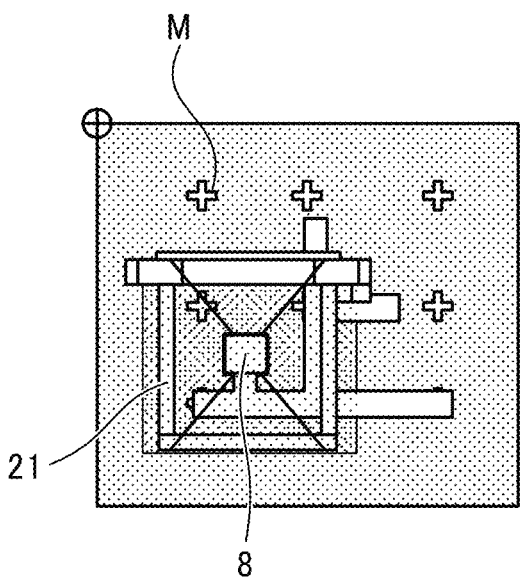

FIGS. 8A and 8B are diagrams illustrating a second setting example of the reference position, according to an embodiment of the present disclosure. As illustrated in FIGS. 8A and 8B, in the second setting example of the reference position, the liquid application apparatus 1 prints the reference positions that are detection marks M at the four corners of an image. The image connection measuring unit 51 causes the two-dimensional camera 8 to read the detection marks M, estimates the self-position of the liquid application apparatus 1 based on the read information, and sets the self-position as the reference origin for the start of image writing. Specific descriptions are given as follows.

The ink discharge head 2 (carriage) prints the detection marks M at four corners of an image forming area. The liquid application apparatus 1 moves such that one or more of the four detection marks M are included in the image capturing area of the two-dimensional camera 8. The image connection measuring unit 51 estimates positions of the detection marks M based on GNSS information (rough position estimation).

The image connection measuring unit 51 extracts the detection marks M from the two-dimensional image at the center position of the estimated detection marks M to detect the position (fine position estimation).

According to the second setting example of the reference position, since the liquid application apparatus 1 provides the reference positions at the four corners of the printing area of the liquid application apparatus 1, the overlapping area of the printing areas can be reduced. Accordingly, the print time can be reduced.

Figure 9A:
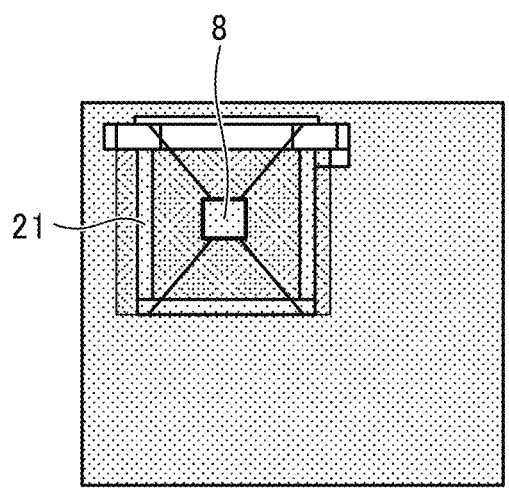
FIGS. 9A and 9B are diagrams illustrating a third setting example of the reference position, according to an embodiment of the present disclosure.
Figure 9B:
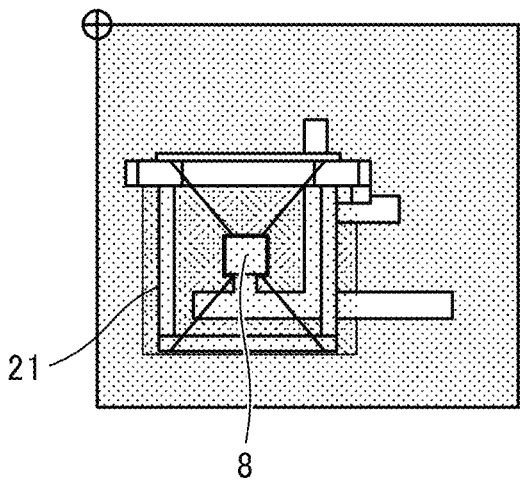

FIGS. 9A and 9B are diagrams illustrating a third setting example of the reference position, according to an embodiment of the present disclosure. As illustrated in FIGS. 9A and 9B, in the third setting example of the reference position, the liquid application apparatus 1 divides the printing area into a plurality of areas such that printed images are overlapped (connected) in the plurality of areas. The image connection measuring unit 51 causes the two-dimensional camera 8 to read an edge of a character or symbol. i.e., the reference position, estimates the self-position of the liquid application apparatus 1 based on the read information, and sets the self-position as the reference origin for the start of image writing. Specific descriptions are given as follows.

The ink discharge head 2 (carriage) prints an image. The liquid application apparatus 1 moves such that an edge of a printed image is included in the image capturing area of the two-dimensional camera 8. The image connection measuring unit 51 estimates the position of the edge of the printed image based on GNSS information (rough position estimation).

The image connection measuring unit 51 extracts the position of the edge of the printed image from a two-dimensional image at the center of the estimated position of the edge of the printed image to detect the position (fine position estimation).

According to the third setting example of the reference position, since a part (edge) of the printed image in the preceding segment is set as the reference position, the operation of setting the reference position (step S25 in FIG. 5) can be simplified.

Figure 10A:
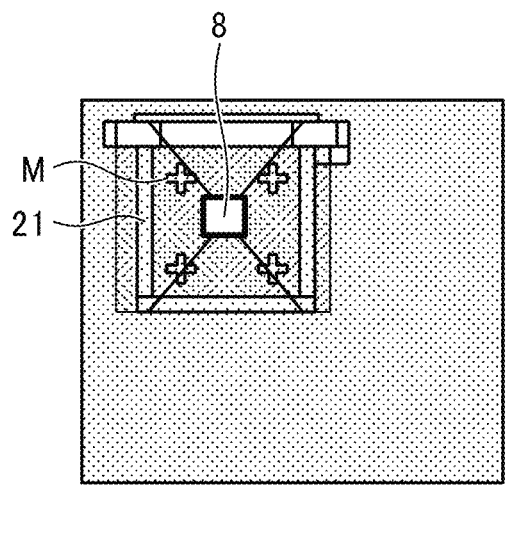
FIGS. 10A and 10B are diagrams illustrating a fourth setting example of the reference position, according to an embodiment of the present disclosure.
Figure 10B:
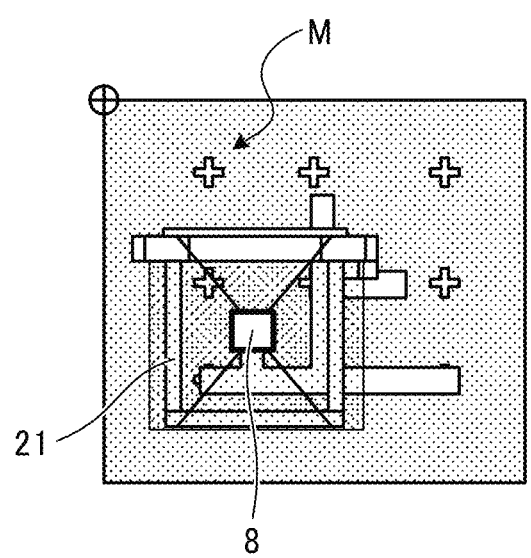

FIGS. 10A and 10B are diagrams illustrating a fourth setting example of the reference position, according to an embodiment of the present disclosure. As illustrated in FIGS. 10A and 10B, in the fourth setting example of the reference position, the liquid application apparatus 1 prints detection marks M (reference position) at four corners of an image by using invisible ink that reacts to a special light source alone such as ultraviolet light. The image connection measuring unit 51 causes the two-dimensional camera 8 to read the detection marks M, estimates the self-position of the liquid application apparatus 1 based on the read information, and sets the self-position as the reference origin for the start of image writing. Specific descriptions are given as follows.

The ink discharge head 2 (carriage) prints the detection marks M with invisible ink at four corners of an image forming area. The liquid application apparatus 1 moves such that one or more of the four detection marks M are included in the image capturing area of the two-dimensional camera 8. The image connection measuring unit 51 estimates positions of the detection marks M based on GNSS information (rough position estimation).

The image connection measuring unit 51 extracts the detection marks M from the two-dimensional image at the estimated center position of the detection marks M to detect the position (fine position estimation).

According to the fourth setting example of the reference position, the ink is invisible ink. As a result, even when large detection marks M or a large number of detection marks M are printed, the printed detection marks M have no influence on the appearance of the image, thus allowing printing with less noticeable image joints.

Figure 11A:
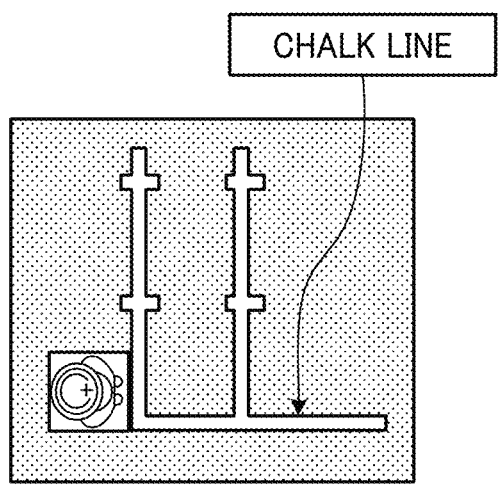
FIGS. 11A and 11B are diagrams illustrating a fifth setting example of the reference position, according to an embodiment of the present disclosure.
Figure 11B:
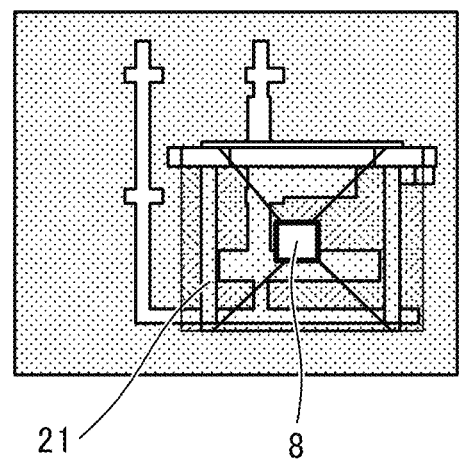

FIGS. 11A and 11B are diagrams illustrating a fifth setting example of the reference position, according to an embodiment of the present disclosure. As illustrated in FIGS. 11A and 11B, in the fifth setting example of the reference position, a reference axis is set as the reference position by a chalk line drawn in advance, and the image connection measuring unit 51 causes the two-dimensional camera 8 to read the chalk line, estimates the self-position of the liquid application apparatus 1 based on the read information, and sets the self-position as the reference origin for the start of image writing. Specific descriptions are given as follows.

An operator draws a minimum choke line on a road surface. The liquid application apparatus 1 moves such that the chalk line is included in the image capturing area of the two-dimensional camera 8. The image connection measuring unit 51 estimates the position of the chalk line based on GNSS information (rough position estimation).

The image connection measuring unit 51 extracts the chalk line from the two-dimensional image at the center of the estimated position of the chalk line to detect the position (fine position estimation).

According to the fifth setting example of the reference position, since the chalk line is used as a reference, the overlapping area of printing areas is eliminated, and the printing time is further reduced.

Blurring Processing for Overlapping Area

As described above, in the present embodiment, when the liquid application apparatus 1 moves to print a plurality of images obtained by dividing an entire image into a plurality of segments, the density control unit 53 executes blurring processing on an overlapping area between adjacent images. Next, descriptions are given of some examples in which blurring processing is executed on an overlapping area provided between adjacent images.

Figure 12A:
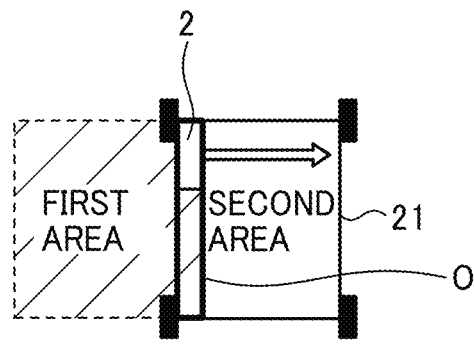
FIGS. 12A, 12B, and 12C are diagrams illustrating a first example of blurring processing applied to an overlapping area, according to an embodiment of the present disclosure.
Figure 12B:
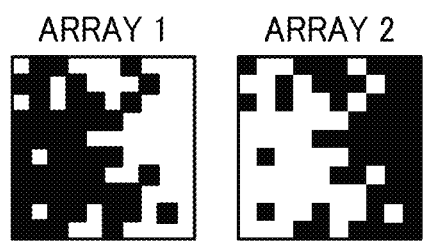
Figure 12C:
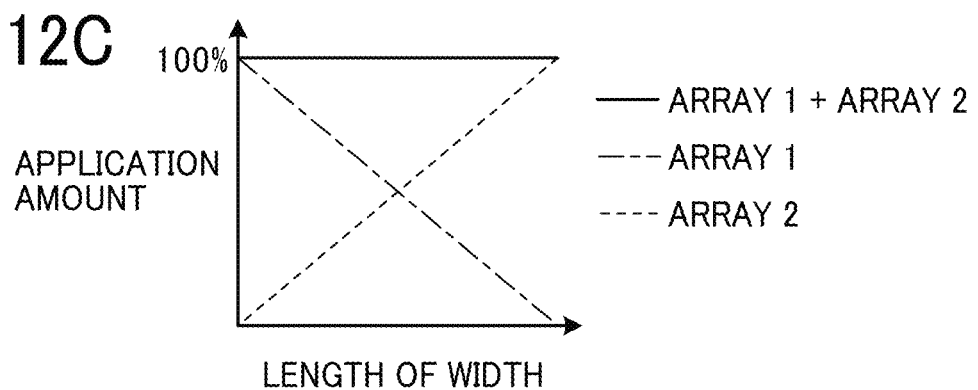

FIGS. 12A, 12B, and 12C are diagrams illustrating a first example of the blurring processing applied to the overlapping area, according to an embodiment of the present disclosure. FIG. 12A illustrated an overlapping area O of left and right images. FIG. 12B illustrates two masks used in the blurring processing. FIG. 12C illustrates an application amount of ink of each mask with respect to the overlapping area. The first example illustrated in FIGS. 12A, 12B, and 12C indicates the blurring processing applied to the overlapping area of the two images. The blurring processing applied to the overlapping area O of the two images illustrated in FIG. 12A uses, as the two masks, one mask and the other mask obtained by reversing the one mask. An area printed as a first area in the overlapping area O is processed such that the application amount of ink decreases from the left of the first area to the right of the first area, for example, as in an array 1 illustrated in FIG. 12B. Then, an area printed as a second area in the overlapping area O is processed with an array 2 in which the array 1 is reversed. As illustrated in the graph of FIG. 12C, when the array 1 and the array 2 are added, the application amount of ink is one hundred percent with respect to the image data (application data). In the present embodiment, the case where the application can be performed according to the image data indicates that the application amount of ink is one hundred percent. The reverse processing is used in a case where one image is divided into two areas and the two areas are overwritten (applied). The density control unit 53 can complement the two areas with each other to obtain a full image.

Figure 13A:
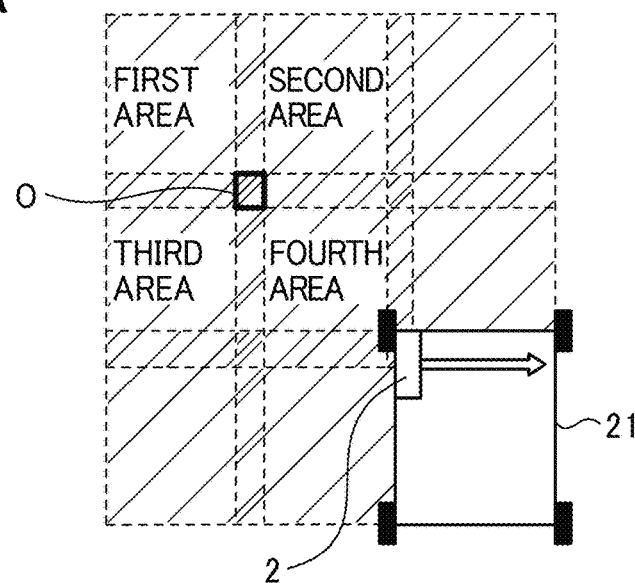
FIGS. 13A and 13B are diagrams illustrating a second example of blurring processing applied to the overlapping area, according to an embodiment of the present disclosure.
Figure 13B:

FIGS. 13A and 13B are diagrams illustrating a second example of the blurring processing applied to the overlapping area, according to an embodiment of the present disclosure. FIG. 13A illustrates the overlapping areas O of four images on the upper, lower, left, and right sides. FIG. 13B illustrates masks used for the blurring processing. The second example illustrated in FIGS. 13A and 13B indicates the blurring processing applied to the overlapping areas of the four images. The blurring processing applied to the overlapping areas of the four images illustrated in FIGS. 13A and 13B uses a mask generated by multiplying masks in two directions. As illustrated in FIG. 13B, an area printed as first area in the overlapping area O is processed with a mask generated by multiplying the processing for connecting divided areas in the vertical direction and the processing for connecting divided areas in the horizontal direction. Arrays 1 to 4 are generated as illustrated in FIG. 13B. When the arrays 1 to 4 are added together, the application amount of ink is one hundred percent.

Figure 14A:
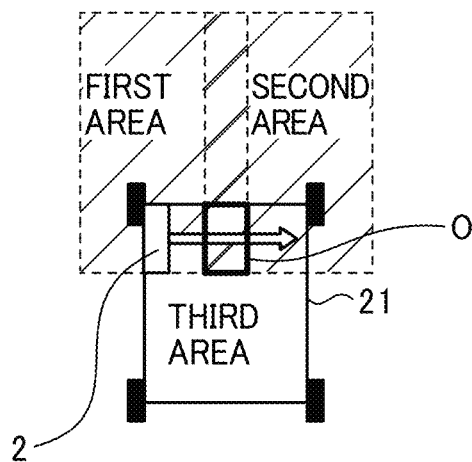
FIGS. 14A and 14B are diagrams illustrating a third example of blurring processing applied to the overlapping area, according to an embodiment of the present disclosure.
Figure 14B:
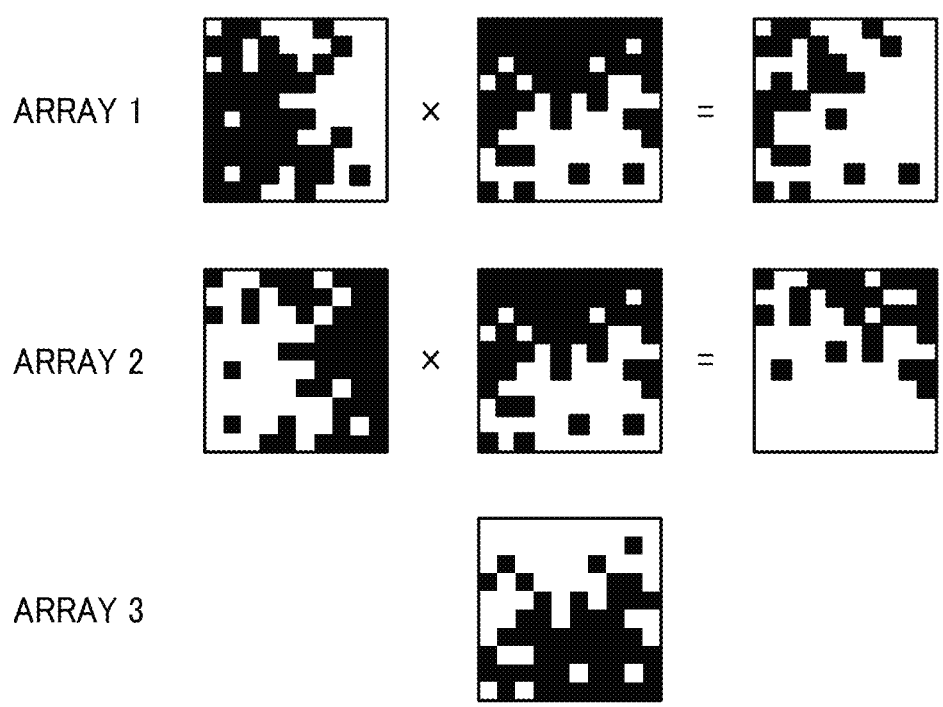

FIGS. 14A and 14B are diagrams illustrating a third example of the blurring processing applied to the overlapping area, according to an embodiment of the present disclosure. FIG. 14A illustrates the overlapping area O of three images. FIG. 14B illustrates a mask used for the blurring processing. The third example illustrated in FIGS. 14A and 14B indicates the blurring processing applied to the overlapping area O when an area is shifted. Even when the area is shifted as illustrated in FIG. 14A, as illustrated in FIG. 14B, the blurring processing using masks generated by a method similar to the above-described example is applied to the overlapping area O. In the case of the blurring processing for an image divided into three or more areas as illustrated in FIGS. 14A and 14B (e.g., in the case where an upper or lower area overlaps on left and right areas), masks are not directly reversed. The density control unit 53 can overwrite (apply) masks on three areas to match an original image. Thus, the masks on the three areas complement each other.

The density control unit 53 may recognize the state of the liquid application area and change the application amount of ink. The density control unit 53 may increase the application amount of ink, for example, to prevent a white void from occurring at an edge such as an end portion of a line in the image.

Figure 15:
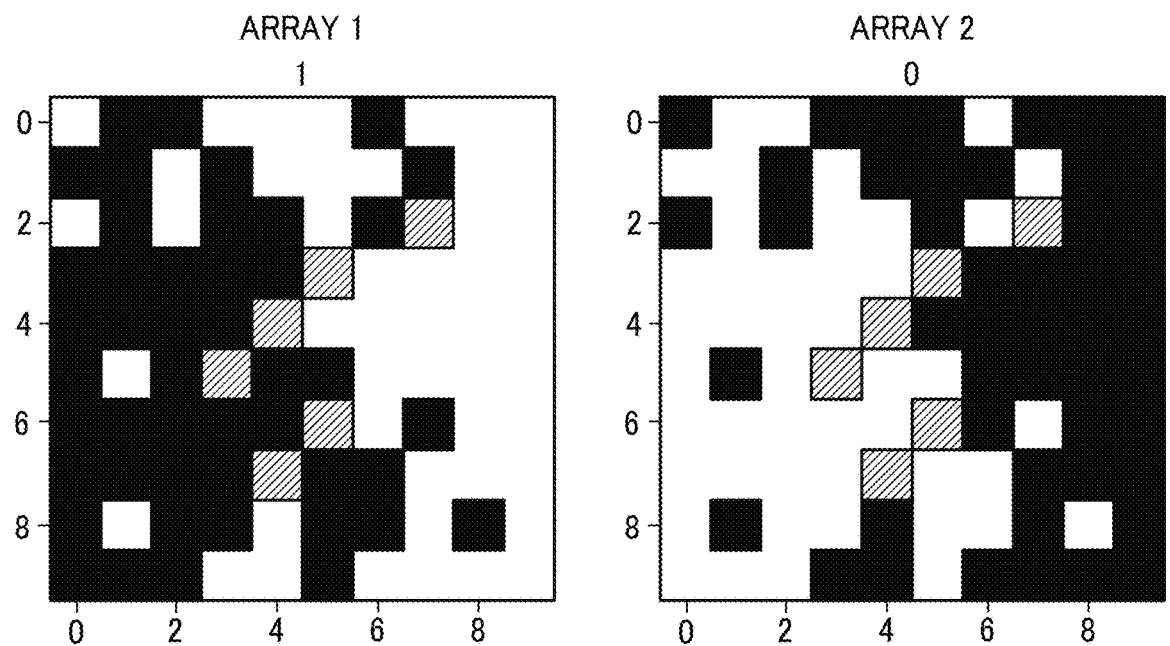
FIG. 15 is a diagram illustrating an example of overlaps in the overlapping area.

FIG. 15 is a diagram illustrating an example of overlaps in the overlapping area. In the example illustrated in FIG. 15, dot arrays (array 1 and array 2) at the end portion of each divided area are indicated. Hatched portions illustrated in FIG. 15 indicate portions to be applied with the respective arrays (array 1 and array 2). The density control unit 53 calculates an application amount of ink in consideration of overlap in right and left areas or right, left, upper, and lower areas in an overlapping area in which end portions of respective divided areas obtained by dividing a printing area into a plurality of areas overlap with each other, and executes blurring processing in which application density in the X and Y scanning directions is adjusted.

Figure 16:
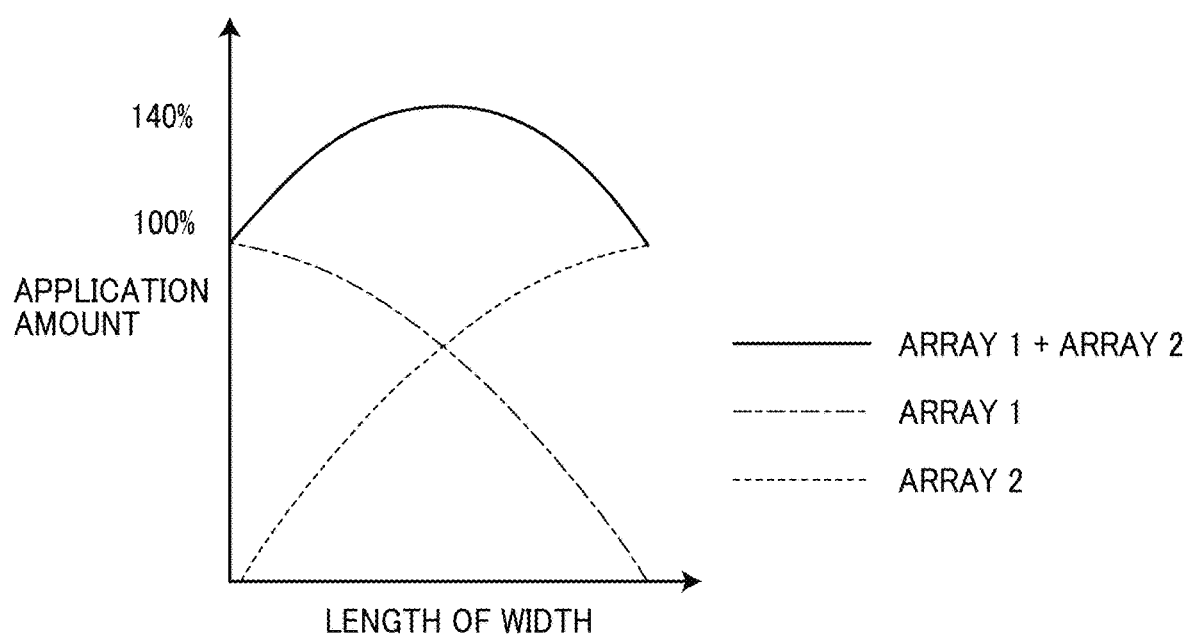
FIG. 16 is a diagram illustrating an example of adjustment of application density.

FIG. 16 is a diagram illustrating an example of adjustment of application density according to an embodiment of the present disclosure. As illustrated in FIG. 16, the adjustment of the application density includes a total application amount of ink exceeding one hundred percent. In other words, the density control unit 53 may increase the application amount of ink in the overlapping area.

Note that examples of the overlap in the left, right, upper, and lower areas include the case where the upper area overlaps the left and right areas and the case where two areas of the upper area and the lower area overlap the left and right areas in addition to the case where the lower area overlaps the left and right areas as illustrated in FIG. 14 described above.

The density control unit 53 may change the application amount of ink in accordance with irregularities of a printing target surface (liquid application area) such as a road. As illustrated in FIG. 16, the application amount of ink changed according to the irregularities of the print target surface such as a road may exceed the total application amount of ink of one hundred percent.

Next, descriptions are given of a process for changing the application amount of ink.

Figure 17:
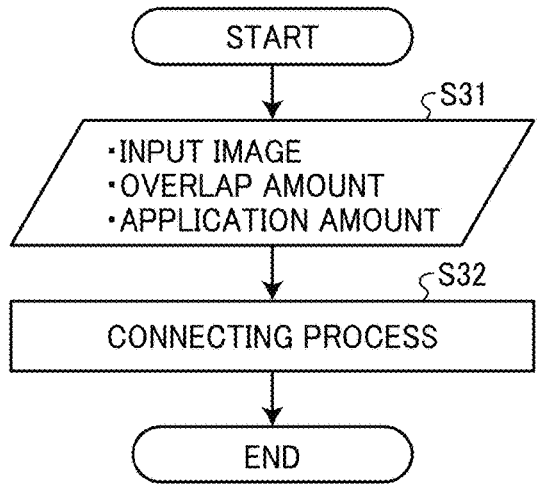
FIG. 17 is a flowchart illustrating a process for changing an application amount of ink based on input by a user.

FIG. 17 is a flowchart illustrating a process for changing the application amount of ink in the case of a user input.

First, as illustrated in FIG. 17, the density control unit 53 receives inputs of an input image, an overlap amount, and an application amount of ink from the user (step S31). The overlap amount indicates a dimension in which the blurring processing is applied to end portions of divided images to be printed adjacent to each other. The application amount of ink indicates a total application amount of ink applied to the overlapping area.

Note that the density control unit 53 may convert the overlap amount and the application amount of ink into numerical values or levels such that input can be selectable. The density control unit 53 may be able to select from three levels of application amounts, for example, one hundred percent, one hundred twenty percent, and one hundred forty percent, with one hundred percent as a lower limit for simplicity.

Next, as illustrated in FIG. 17, the arithmetic device 6 executes an image connecting process for setting a reference position (start position of image writing) (step S32).

Figure 18:
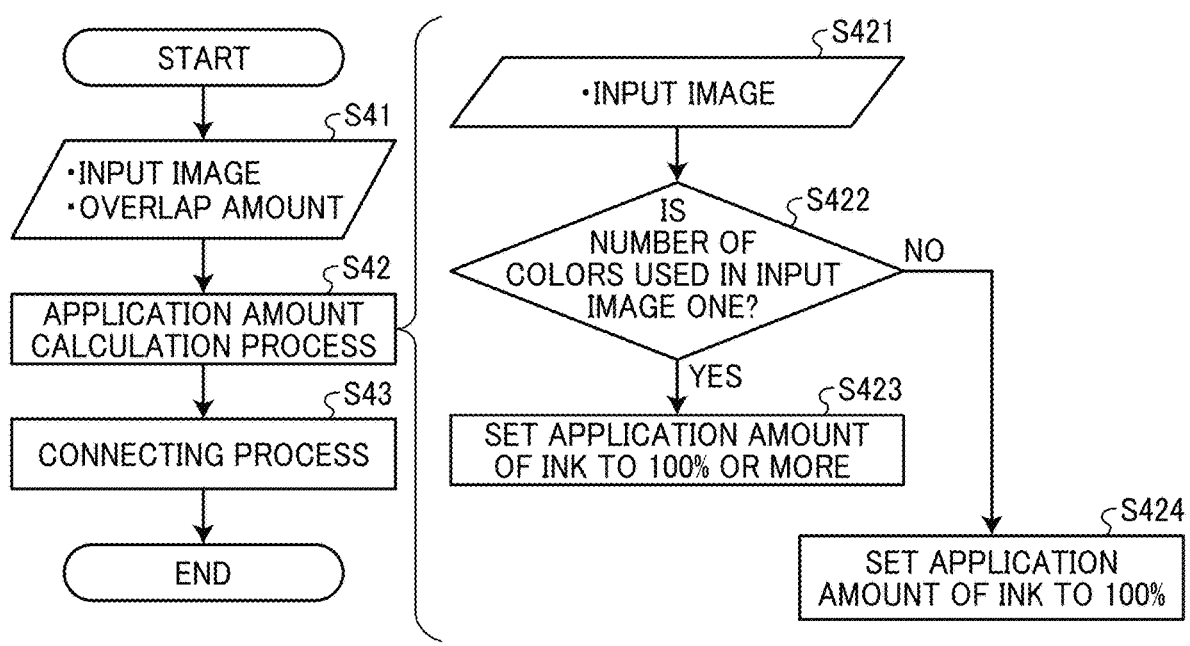
FIG. 18 is a flowchart illustrating a process for changing an application amount of ink in the case of detecting the number of colors.

FIG. 18 is a flowchart illustrating a process for changing the application amount of ink in the case of detecting the number of colors.

First, as illustrated in FIG. 18, the density control unit 53 receives inputs of an input image and an overlap amount (step S41).

Next, as illustrated in FIG. 18, the density control unit 53 executes a calculation process of application amount of ink (step S42).

More specifically, when the density control unit 53 receives the input of the input image (step S421), the density control unit 53 determines whether the number of colors used in the input image is one (step S422) and changes the total application amount of ink according to the number of colors of the input image.

When the number of colors used in the input image is one color (YES in step S423), the density control unit 53 sets the total application amount of ink to one hundred percent or more (e.g., 200%) (step S422). When the number of colors used in the input image is two colors (NO in step S424), the density control unit 53 sets the total application amount of ink to one hundred percent (step S422).

Next, as illustrated in FIG. 18, the arithmetic device 6 executes an image connecting process for setting a reference position (start position of image writing) (step S43).

Figure 19:
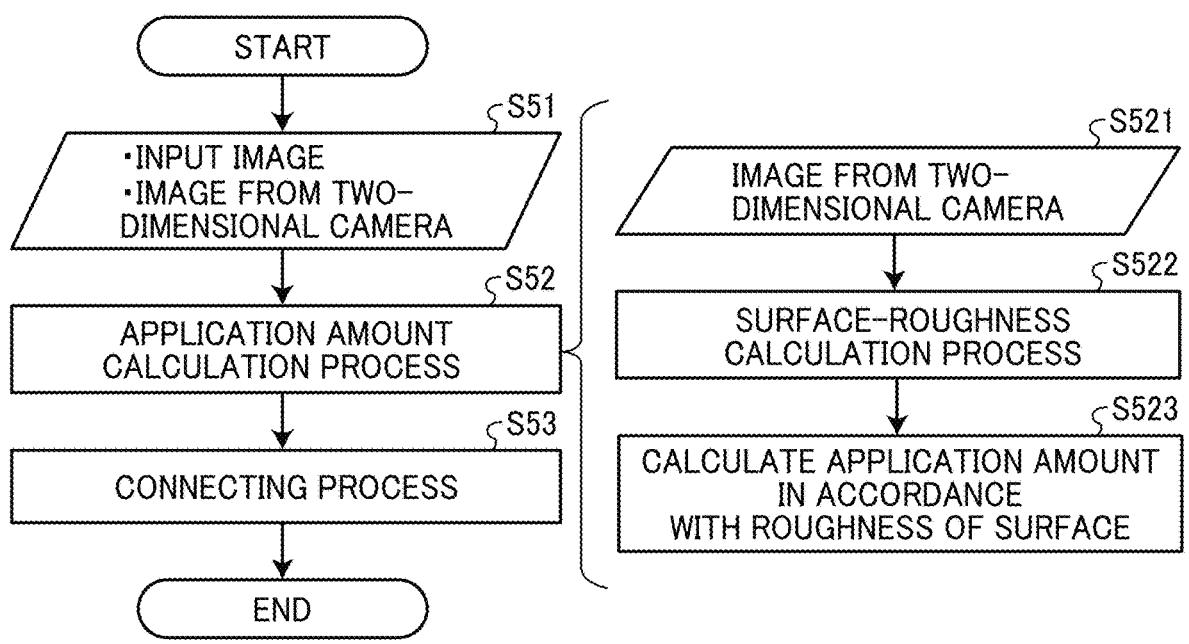
FIG. 19 is a flowchart illustrating a process for changing the application amount of ink in accordance with the road surface condition.

FIG. 19 is a flowchart illustrating a process for changing the application amount of ink in accordance with the road surface condition.

First, as illustrated in FIG. 19, the density control unit 53 receives inputs of an input image and an image from the two-dimensional camera 8 (step S51).

Next, as illustrated in FIG. 19, the density control unit 53 executes a calculation process of application amount of ink (step S52).

More specifically, when the density control unit 53 receives an input of the image from the two-dimensional camera 8 (step S521), the density control unit 53 executes a surface-roughness calculation process for calculating surface roughness from the degree of brightness of the image captured by the two-dimensional camera 8 (step S522). After the surface-roughness calculation process, the density control unit 53 calculates the application amount of ink in accordance with the coefficient value of the surface-roughness (step S523).

For example, as the calculation of the application amount of ink in step S523, the density control unit 53 may simply select, for example, one hundred percent or one hundred forty percent as the application amount of ink in accordance with the coefficient value. The density control unit 53 may determine the type of asphalt (e.g., dense graded asphalt concrete or porous asphalt) as a coefficient value related to the surface roughness from the image captured by the two-dimensional camera 8 and calculate the application amount of ink.

Next, as illustrated in FIG. 19, the arithmetic device 6 executes an image connecting process for setting a reference position (start position of image writing) (step S53).

Note that the blurring processing applied to the overlap area described above is performed in the same manner even when multiple colors are used by a plurality of ink discharge heads 2 (carriages), and the application of the blurring processing is executed such that the multiple colors are mutually reversed and complemented each other.

As described above, according to the present embodiment, the liquid application apparatus 1 can perform liquid application to an area exceeding the scanning range of the ink discharge head 2. According to the present embodiment, the density control unit 53 calculates an application amount of ink in consideration of overlap in right and left areas or right, left, upper and lower areas in an overlapping area in which end portions of respective divided areas obtained by dividing a printing area into a plurality of areas overlap with each other, and executes blurring processing in which application density in the X and Y scanning directions is adjusted, and executes blurring processing in which application density in the X and Y scanning directions is adjusted. Accordingly, the appearance of the overlapping area is smooth.

According to the present embodiment, the liquid application apparatus 1 implements highly accurate self-position estimation of the liquid application apparatus 1, and thus the liquid application apparatus 1 can perform printing such that joints of divided areas in an image are less noticeable. In particular, since the joints corresponding to end portions of the divided areas, the overlapping area of the printing area can be reduced. As a result, the time for printing the entire image can be reduced. The joints of the divided areas are reduced, and the liquid application apparatus 1 can print a clean image (e.g., a small magnification error or a small skew).

According to the present embodiment, the liquid application apparatus 1 roughly measures the self-position coordinates (position and posture) of the liquid application apparatus 1 by the self-position estimation method in which GNSS measurement using the GPS 9 and an image (ambient image data) captured by the three-dimensional camera 7 are combined. After that, the liquid application apparatus 1 causes the two-dimensional camera 8 to acquire road surface information and precisely estimates the self-position of the ink discharge head 2 (carriage) based on the acquired information. Accordingly, the liquid application apparatus 1 obtains the positional accuracy that is needed for image connection, and thus can automatically perform printing on a wide area.

Note that programs executed by the liquid application apparatus 1 according to the embodiments of the present disclosure are pre-installed and provided in, for example, a read only memory (ROM).

The programs executed by the liquid application apparatus 1 according to the above-described embodiments of the present disclosure may be recorded on a computer-readable recording medium such as a compact disk read only memory (CD-ROM), a flexible disk (FD), a compact disc recordable (CD-R), or a digital versatile disk (DVD) as an installable or executable file and provided. Further, programs executed by the liquid application apparatus 1 according to the embodiments of the present disclosure may be stored on a computer connected to a network such as the Internet and downloaded via the network to provide the program. Programs executed by the liquid application apparatus 1 according to the embodiments of the present disclosure may be provided or distributed via a network such as the Internet.

In the present disclosure, the term "liquid application apparatus" includes a liquid discharge head or a liquid discharge device (unit) and drives the liquid discharge head to discharge liquid. Examples of the liquid application apparatus include an apparatus capable of discharging liquid to a material to which liquid can adhere and an apparatus to discharge liquid toward gas or into liquid.

The liquid application apparatus can include a unit related to feeding, conveyance, and discharge of an object to which a liquid can adhere, a pretreatment apparatus, a post-treatment apparatus.

Examples of the liquid application apparatus include an image forming apparatus which is an apparatus that forms an image on a sheet by discharging ink, and a stereoscopic fabrication apparatus (three-dimensional fabrication apparatus) which discharges fabrication liquid onto a powder layer in which powder is formed in a layer shape to fabricate a stereoscopic fabrication object (three-dimensional object).

Such a liquid application apparatus is not limited to an apparatus that discharge liquid to visualize meaningful images, such as letters or figures. For example, an apparatus that forms a meaningless pattern, or an apparatus that fabricates a three-dimensional image are also included.

The above-described term "material to which liquid can be adhered" represents a material to which the liquid is at least temporarily adhered, a material to which the liquid is adhered and fixed, or a material into which liquid is adhered to permeate. Examples of the "material to which liquid can be adhered" include recording media, such as sheet of paper, recording paper, recording sheet of paper, film, and cloth, electronic components, such as electronic substrate and piezoelectric element, and media, such as powder layer, organ model, and testing cell. The "material to which liquid can be adhered" includes any material to which liquid is adhered, unless particularly limited.

The material of the above-described "material to which the liquid is adhered" is made of any material provided that liquid is adherable at least temporarily to the material. For example, the "material to which liquid is adhered" may include any materials on which liquid adheres even temporarily, such as paper, threads, fibers, fabric, leather, metal, plastic, glass, wood, and ceramic.

Further, the term "liquid" includes any liquid having a viscosity or a surface tension that is dischargeable from the head. However, preferably, the viscosity of the liquid is not greater than 30 mPa·s under ordinary temperature and ordinary pressure or by heating or cooling. Examples of the liquid include a solution, a suspension, or an emulsion including, for example, a solvent such as water or an organic solvent, a colorant such as dye or pigment, a functional material such as a polymerizable compound, a resin, a surfactant, a biocompatible material such as deoxyribonucleic acid (DNA), amino acid, protein, or calcium, and an edible material such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The liquid application apparatus can be an apparatus in which the liquid discharge head and a material to which liquid can adhere move relatively to each other. However, the liquid application apparatus is not limited to such an apparatus. For example, the liquid application apparatus may include a printing device including a serial head device that moves the liquid discharge head or a line head device that does not move the liquid discharge head.

Other examples of the liquid application apparatus include a treatment liquid application apparatus that discharges treatment liquid to a sheet to apply the treatment liquid to the surface of the sheet for the purpose of modifying the surface of the sheet, and an injection granulation apparatus that injects composition liquid in which a raw material is dispersed in a solution through a nozzle to granulate fine particles of the raw material.

The embodiments described above are presented as examples and are not intended to limit the scope of the present disclosure. The above-described embodiments can be implemented in other various forms, and various omissions, replacements, and changes can be made without departing from the scope of the present disclosure. In addition, the embodiments and modifications or variations thereof are included in the scope and the gist of the present disclosure.

Aspects of the present disclosure are, for example, as follows.

Aspect 1

A liquid application apparatus includes a liquid discharge head, a movement control unit, and a head control unit. The liquid discharge head discharges liquid. The movement control unit controls sequential movement of the liquid application apparatus to each of a plurality of divided areas obtained by dividing a liquid application area in which the liquid discharge head performs liquid application. The head control unit controls movement of the liquid discharge head in X and Y scanning directions in each divided area to perform liquid application. The movement control unit moves the liquid application apparatus to an adjacent or a partially-overlapping divided area to connect images each other generated by a liquid application after the head control unit performs the liquid application to the divided area.

Aspect 2

In the liquid application apparatus described in Aspect 1, the movement control unit controls sequential movement of the liquid application apparatus to the adjacent or the partially-overlapping divided area.

Aspect 3

In the liquid application apparatus described in Aspect 1, the head control unit does not perform liquid application in a case where the divided area does not have application data, and the movement control unit controls movement of the liquid application apparatus to the next adjacent or partially-overlapping divided area.

Aspect 4

In the liquid application apparatus described in Aspect 1 or Aspect 3, the liquid application apparatus further includes a density control unit. The density control unit calculates an application amount of liquid in consideration of an overlap of at least two areas in left and right areas, or left, right, upper, and areas in an overlapping area where end portions of divided areas obtained by dividing a printing area into a plurality of areas overlap with each other, and execute blurring processing in which application density in X and Y scanning direction is adjusted.

Aspect 5

In the liquid application apparatus described in Aspect 4, the density control unit uses, as two masks, one mask and the other mask obtained by reversing the one mask when the blurring processing is applied to the overlapping area of the two divided areas.

Aspect 6

In the liquid application apparatus described in Aspect 4, the density control unit uses a mask generated by multiplying masks in two directions when the blurring processing is applied to the overlapping areas of the four divided areas.

Aspect 7 In the liquid application apparatus described in Aspect 4 or Aspect 6, the density control unit recognizes a state of the liquid application area and change the application amount of liquid.

Aspect 8

A liquid application method is executed by a liquid application apparatus including a liquid discharge head to discharge liquid. The liquid discharge method includes: sequentially moving the liquid application apparatus to each of a plurality of divided areas obtained by dividing a liquid application area in which the liquid discharge head performs liquid application; moving the liquid discharge head in X and Y scanning directions in each divided area to perform liquid application; and moving the liquid application apparatus to an adjacent or a partially-overlapping divided area to connect images each other generated by a liquid application after performing the liquid application to the divided area.

Aspect 9

A program is performed by a liquid application apparatus. The program causes the liquid application apparatus to execute a process. The process includes: discharging liquid by a liquid discharge head; sequentially moving the liquid application apparatus to each of a plurality of divided areas obtained by dividing a liquid application area in which the liquid discharge head performs liquid application; moving the liquid discharge head in X and Y scanning directions in each divided area to perform liquid application; and moving the liquid application apparatus to an adjacent or a partially-overlapping divided area to connect images each other generated by a liquid application after performing the liquid application to the divided area.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A liquid application apparatus comprising:
a liquid discharge head configured to discharge liquid; and
processing circuitry configured to:
cause the liquid application apparatus to sequentially move to each of a plurality of divided areas obtained by dividing a liquid application area in which the liquid discharge head performs liquid application;
cause the liquid discharge head to move in X and Y scanning directions in each of the plurality of divided areas to perform liquid application;
after the liquid discharge head performs first liquid application to one divided area of the plurality of divided areas, cause the liquid application apparatus to move to another one divided area adjacent to or partially overlapping the one divided area and cause the liquid discharge head to perform second liquid application to said another one divided area to connect an image generated by the first liquid application and an image generated by the second liquid application;
calculate an application amount of liquid in consideration of an overlap of left and right divided areas or at least two divided areas of left, right, upper, and lower divided areas in an overlapping area where end portions of divided areas of the plurality of divided areas overlap each other; and
execute blurring processing of adjusting application density in the X and Y scanning directions using two masks, one mask and the other mask obtained by reversing the one mask when the blurring processing is applied to the overlapping area, in a case where end portions of two divided areas in the plurality of divided areas overlap each other in the overlapping area.

2. The liquid application apparatus according to claim 1, wherein the processing circuitry is configured to cause the liquid application apparatus to sequentially move from one to next one adjacent to or partially overlapping the one of the plurality of divided areas.

3. The liquid application apparatus according to claim 1, wherein the processing circuitry is configured to: in a case where one of the plurality of divided areas does not have application data,
skip liquid application to the one of the plurality of divided areas; and
cause the liquid application apparatus to move to a next divided area adjacent or partially overlapping the one of the plurality of divided areas.

4. The liquid application apparatus according to claim 1, wherein:
the processing circuitry is configured to recognize a state of the liquid application area and change the application amount of liquid.

5. A liquid application apparatus, comprising:
a liquid discharge head configured to discharge liquid; and
processing circuitry configured to:
cause the liquid application apparatus to sequentially move to each of a plurality of divided areas obtained by dividing a liquid application area in which the liquid discharge head performs liquid application;
cause the liquid discharge head to move in X and Y scanning directions in each of the plurality of divided areas to perform liquid application;
after the liquid discharge head performs first liquid application to one divided area of the plurality of divided areas, cause the liquid application apparatus to move to another one divided area adjacent to or partially overlapping the one divided area and cause the liquid discharge head to perform second liquid application to said another one divided area to connect an image generated by the first liquid application and an image generated by the second liquid application;
calculate an application amount of liquid in consideration of an overlap of left and right divided areas or at least two divided areas of left, right, upper, and lower divided areas in an overlapping area where end portions of divided areas of the plurality of divided areas overlap each other; and
execute blurring processing of adjusting application density in the X and Y scanning directions using a mask generated by multiplying masks in two directions to apply the blurring processing to the overlapping area, in a case where end portions of four divided areas in the plurality of divided areas overlap each other in the overlapping area.

6. A liquid application method to be executed in a liquid application apparatus including a liquid discharge head, the method comprising:
sequentially moving the liquid application apparatus to each of a plurality of divided areas obtained by dividing a liquid application area in which the liquid discharge head performs liquid application;
moving the liquid discharge head in X and Y scanning directions in each of the plurality of divided areas to perform liquid application;
after the liquid discharge head performs first liquid application to one divided area of the plurality of divided areas, moving the liquid application apparatus to another one divided area adjacent to or partially overlapping the one divided area and causing the liquid discharge head to perform second liquid application to said another one divided area to connect an image generated by the first liquid application and an image generated by the second liquid application;
calculating an application amount of liquid in consideration of an overlap of left and right divided areas or at least two divided areas of left, right, upper, and lower divided areas in an overlapping area where end portions of divided areas of the plurality of divided areas overlap each other; and
executing blurring processing of adjusting application density in the X and Y scanning directions using, as two masks, one mask and the other mask obtained by reversing the one mask when the blurring processing is applied to the overlapping area, in a case where end portions of two divided areas in the plurality of divided areas overlap each other in the overlapping area.

* * * * *